O. G. SIMMONS.
INVOLUTE CURVE GENERATING MACHINE.
APPLICATION FILED APR. 5, 1917.
1,326,696.
Patented Dec. 30, 1919.
2 SHEETS—SHEET 2.
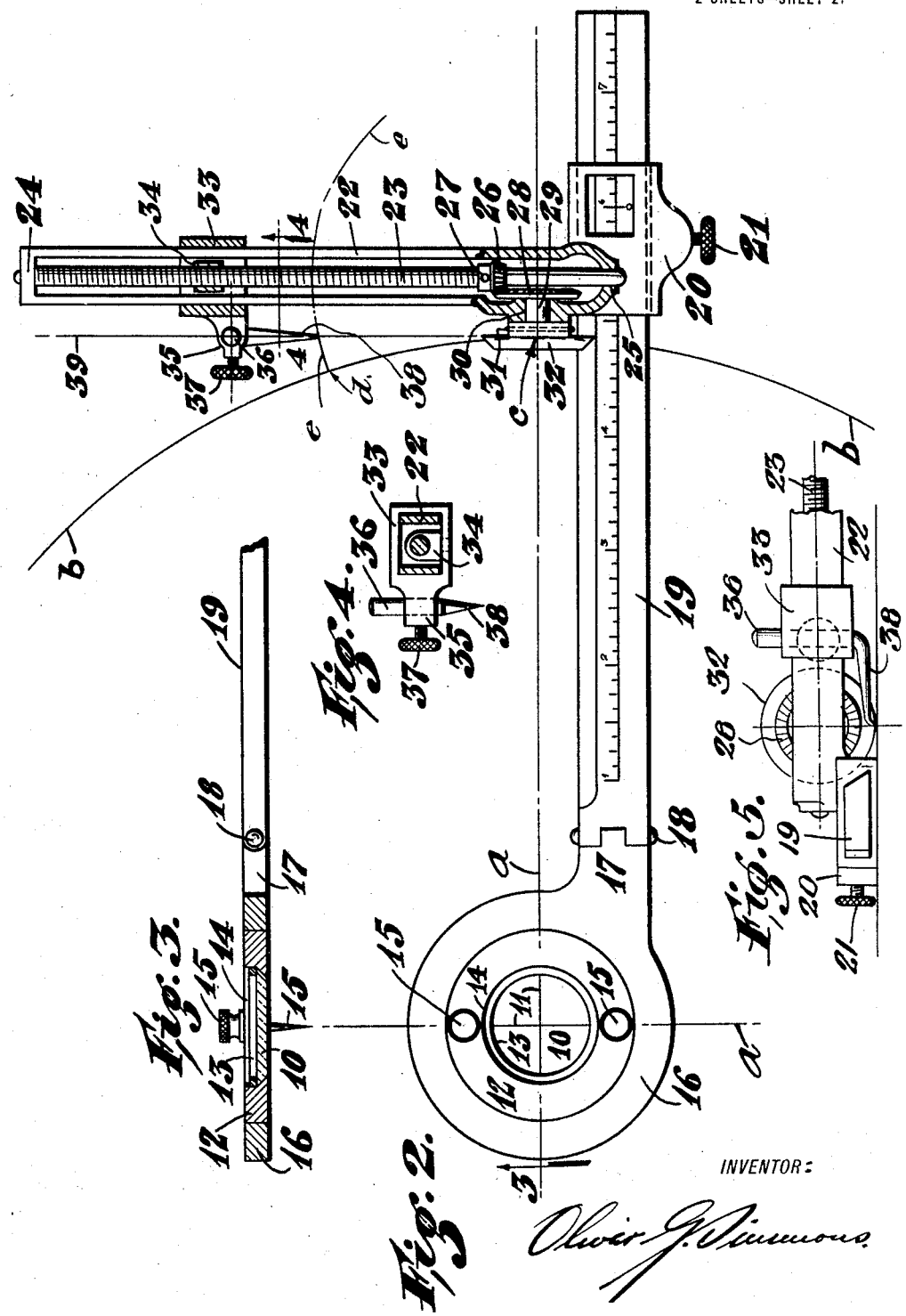
INVENTOR:
Oliver G. Simmons

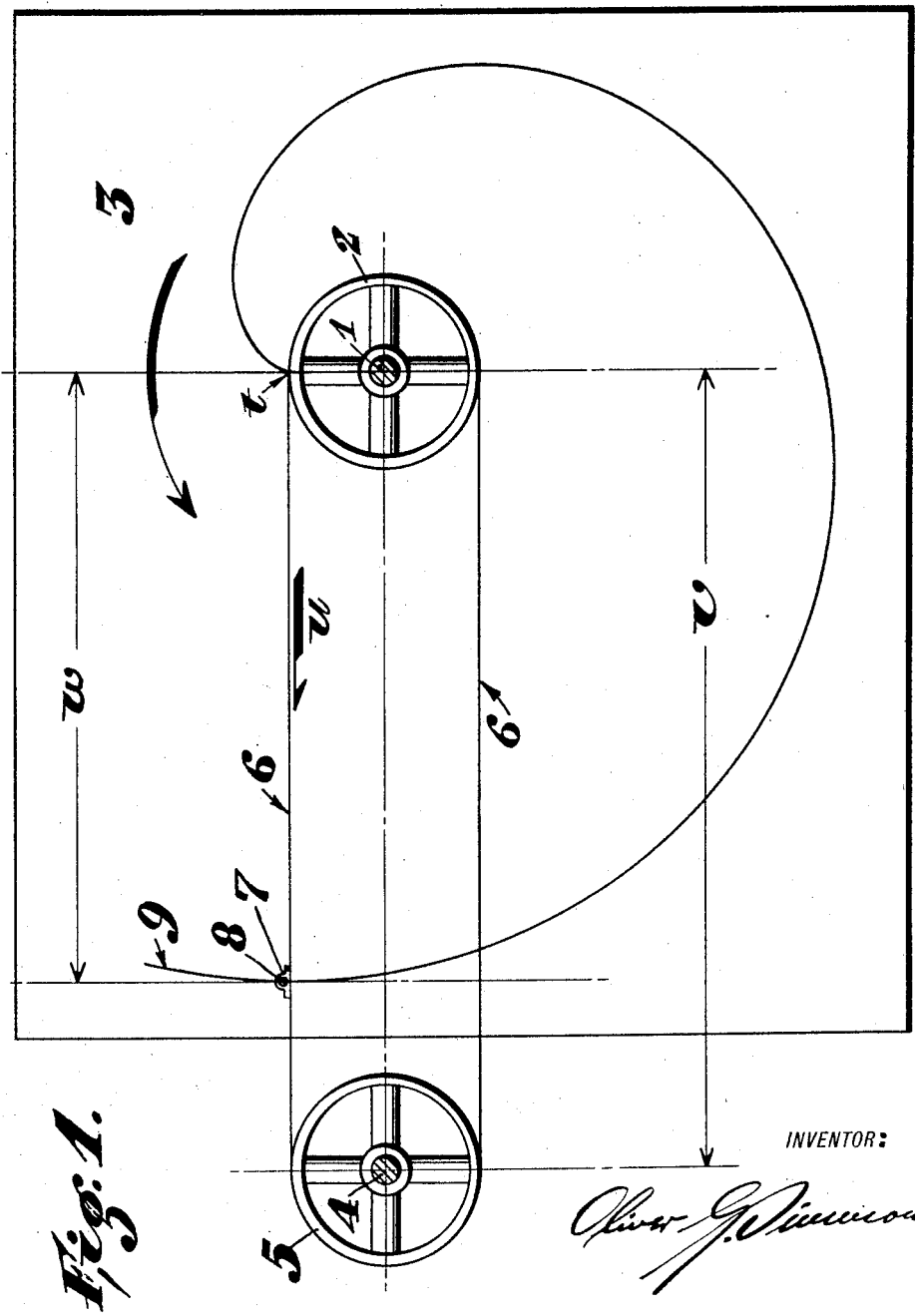

UNITED STATES PATENT OFFICE.

OLIVER G. SIMMONS, OF ROCHESTER, NEW YORK.

INVOLUTE-CURVE-GENERATING MACHINE.

1,326,696.      Specification of Letters Patent.      Patented Dec. 30, 1919.

Application filed April 5, 1917. Serial No. 159,996.

*To all whom it may concern:*

Be it known that I, OLIVER G. SIMMONS, a citizen of the United States, residing at Rochester, in the county of Monroe and State of New York, have invented a new and useful Improvement in Involute-Curve-Generating Machines, of which the following is a specification.

This invention relates to a machine for scribing a curve and particularly an involute curve generating device whereby true involute curves of any circle selected may be generated, each curve with a lead equal to the perimeter of the circle selected.

The general object of my invention is to produce a novel machine for generating a curve according to a given law.

An object of the invention consists in providing an involute curve generator with means, which, when said generator is set to the diameter of any circle, will automatically be set to generate an involute curve having a lead equal to the perimeter of the circle selected.

Another object of the invention is to provide means to set and hold the generator concentric with respect to any given circle.

The above and other objects of the invention will hereinafter more clearly appear from the following description of my invention illustrated in the accompanying drawings, in which—

Figure 1, is a diagrammatic plan which is useful in demonstrating the correctness of my law of the involute and its relation to my device.

Fig. 2, is a plan and partial section of my generator.

Fig. 3, is a horizontal section on the line 3—3 of Fig. 2, looking in the direction of the arrow, and—

Fig. 4, is a sectional view on the line 4—4 of Fig. 2, viewed in the direction of the arrow.

Fig. 5 is an elevation showing the right end of the device as viewed in Fig. 2.

In the drafting departments of manufacturing plants, in the class room and laboratory of technical schools, the involute curve is usually generated either by means of the unwinding or winding of a taut string from or on the surface of a cylinder, or by means of the rolling method in which two circular figures are employed, formed each on a sheet of paper, one of the sheets being transparent; the circular figures, then, are rolled upon each other by means of pins, etc., the involute curves of the circle are generated. These methods are cumbersome and inaccurate.

The principle underlying my method of generating involute curves is based on the discovery of the law of the involute curve, previously referred to, that if an involute curve is measured on a line tangent to the generating or base circle, the measure or lead of this curve (*i. e.* the distance between spires) will be constant, and will be equal to the perimeter of the generating circle. Thus, expressing this truth as a formula, if D equals the diameter of the base circle or generating circle then, "lead" equals $D \times 3.1416$.

In other words, the lead of any involute is equal to the perimeter of its evolute.

In order that the principle underlying my method and the means employed in my involute generator may be more clearly understood, I will first demonstrate the correctness of the law above referred to, and then describe the means by which I generate involute curves in accordance with said law.

Referring now to Fig. 1, the numeral 1 indicates a shaft upon which is mounted a pulley 2, adapted to be rotated with or upon said shaft. To the pulley 2 there is rigidly secured a piece of card-board 3 which is adapted to rotate with the pulley. To the left of the shaft 1 is located another shaft 4 upon which is mounted a pulley 5, similar to the pulley 2. A belt 6 which is represented as a line, is mounted upon the pulleys 2 and 5 in the usual way so that the movement of said belt will cause said pulleys to move likewise. On the belt 6 there is firmly fastened a holder 7 adapted to receive a scriber or marking point 8, the point of which lies upon the tangent plane coinciding with the upper run of the belt 6. If, now, the point of the scriber 8 is placed at the point of tangency *t* and in contact with the card-board 3, and if the belt 6 is moved in the direction of the arrow *u* a distance equal to the perimeter of the pulley 2, and the movement is then stopped, there will be generated the involute curve 9, while the pulley 2 will have made one revolution. It is assumed that the shafts 1 and 4 have been supported at a sufficient distance apart, v, to permit the free turning of the card-board 3. It is obvious, therefore, that since the point of the scriber has been moved along the tangent line a distance equal to the perimeter of the pulley 2, that this distance W represents the "lead" of the involute as well as the perimeter of the pulley 2, which it will be seen, is the evolute of the involute curve 9. It is further obvious that for each distance W the scriber 8 moves the pulley 2 will make one additional revolution. It follows, therefore, that the sum of all the distances W will equal the perimeter of the pulley 2 multiplied by the number of its revolutions. The above illustration and description it is thought will make clear the truth of my law which it may be convenient to restate as follows:

The involute of any evolute has constant lead when measured on a line tangent to said evolute, and is equal to the perimeter of the generating evolute.

The truth of the above law has only been demonstrated herein in connection with an evolute in the form of a circle but it can be demonstrated to be true with an evolute of any form.

In view of the possible use of the generator, forming the basis of this application, in universities and technical schools, and in view of the fact that the length of the involute curve is only approximated in the calculus, it is thought advisable to give my formula in more general terms to cover the length of the involute curve of any circle, measured along the curve from its point of origin to the generating or marking point.

The formula may be expressed as follows, in which:

Let X = the length of the involute curve
Let L = the lead of the involute
Let D = the diameter of the generating circle
Let N = the number of spires to the involute curve
Let Pi = 3.1416.

Then, according to my formula $$X = (NPi)(NL)$$

$$D = \frac{X}{(NPi)^2}$$

It is evident, of course, that by transposition I may determine any of the above factors.

The above principles applying to the generation of an involute curve being true, I conceive a correct definition of such curve to be as follows:

The involute is a curve described as the resultant of uniform movement of a point along a straight line tangent to a given circle and angular movement of the line about the periphery of the circle uniform with the movement of said point and over an arc equal in length to the distance traversed by said point.

I will now proceed to describe the application of my new principle of generating involute curves to the actual generating of such curves by means of my generator, referring particularly to Figs. 2 to 4 of the drawing.

I provide a member such as a slide bar 19 which is mounted to move about a fixed center, and provided with means for moving a scriber rearwardly relatively to the direction of rotation, and thereby generate an involute.

Referring to Fig. 2, the numeral 10 indicates a circular window formed of a translucent plate or disk of glass or celluloid the lower side of which is provided with intersecting center lines 11 for a purpose to be later described. The window 10 is secured concentrically to the circular ring member 12, by any suitable means such as the ring 13 which may be pressed into the bore 14 of the ring member 12. The ring 12 is provided with suitable means such as the tacks 15 for the purpose to be later described. The numeral 16 indicates an annulus or ring shaped head pivoted or swiveled on the circular ring member 12, said head being formed on an extension indicated by the numeral 17 and which is hinged, by means of the pin 18, to a gage-arm or graduated slide bar 19. The graduations on said slide bar 19 may be in the English or metric systems of measurements as desired. Slidingly mounted on the slide bar 19 is the slide bracket 20 provided with the screw means 21 for locking it, that is, for holding it fixed against relative longitudinal movement. Outwardly projecting and forming part of the slide 20, is a guide arm or bracket slide bar 22 disposed at right angles to slide bar 19. In said bracket bar 22 feeding means is provided in the form of the screw member 23 centrally journaled in each end of said bar as indicated by the numerals 24 and 25. Suitable means is provided for imparting rotation to this screw. For this purpose the bevel pinion 26 is secured to it by means of the pin 27. Suitable driving means for the feed screw is provided. For this purpose, engaging the bevel pinion 26 is the bevel gear 28 which gear is provided with a stub shaft 29 journaled at right angles to and in a portion of the bracket bar 22 as indicated by the numeral 30. To the other end of said stub shaft of the gear 28 is fixedly secured, by means of the pin 31, the disk wheel 32, the periphery of which is preferably tapered so that it will present an edge only one circumferential point of which will be in contact, or tangency, with the plane or sheet being scribed upon. Slidingly mounted upon the bracket bar 22 is the working slide or carriage 33, provided with a fixed nut 34 which engages the threads of the screw 23 so that when said screw is rotated, the slide 33 will be moved inwardly or outwardly, depending upon the direction of said rotation. On one side of the slide 33 is provided the extension 35 in which I have provided the working point or scriber 36, (straight as shown but bent when necessary to suit certain conditions) secured to said extension by means of the thumb screw 37. The point 38 (Fig. 4), of said scriber 36, should lie upon a line which is parallel to the longitudinal axis of the bracket 22 and which line, such as line 39, is also in the plane of the extreme edge of the disk, in which plane lies the theoretical single circumferential tangent point of the disk wheel 32, as indicated at c.

The point c may be regarded as a fixed point with respect to the member or arm 19, which point is removed from the fixed center, so that as the arm rotates about the fixed center this point c will describe an arc, and for any given arc of movement of this point c the scriber will be moved away from the point c a distance equal to the arc generated by the point c.

It is obvious that if the disk wheel 32 is rotated, the slide 33 will be constrained to move longitudinally upon the bar 22 by virtue of the bevel gears and means previously referred to, and it is evident from my law of the involute that such longitudinal movement must correspond in measure, to the perimeter of the greatest diameter of the disk wheel 32. If we assume this diameter to be equal to one inch, the perimeter will equal $Pi \times 1$ or equal to 3.1416 inches which is the measure of the longitudinal distance the slide 33 must move for one revolution of the disk. Hence I give the threads of screw 23 such a pitch, and proportion the gears 26 and 28 so that for each revolution of the unit disk the scriber 36 will move 3.1416 inches outwardly on screw 23.

I will now describe the method of procedure in operating the generator to generate an involute curve corresponding to any given circle: I first draw the usual intersecting center lines a a using a board or plane to support the surface being operated upon, and from the point of intersection, as a center, I describe the arc b of a circle. I now set the slide 20 to the radius of the circle b by means of the graduations. Let us assume for convenience that the radius of the circle having the arc b is equal to six inches. I then take the ring 12 and by means of the cross lines 11, line up the same with the center lines a a and press home the thumb tacks 15, Fig. 3. I then place a bent scriber in the extension 35 and move the slide toward the bar 19, by rotating the wheel 32, by hand until the scribing point 38 of the bent scriber moves into contact with the lowermost point of the edge of the disk wheel, which will be under the point indicated by the letter c, that is to say, on the board and at the point of intersection of one of the center lines a and the curve of the circle b. I then place the generator on the ring 12, having previously selected the point d as the origin of the involute curve. I also place the left hand on the ring 12 and with the right hand press slightly to prevent disk wheel 32 from sliding, and then rotate the right end of the generator toward the right. The disk wheel 32 will roll along the curve b and the slide 33 moves away from the operator; the marking point 38 will generate the involute curve e having as its evolute the arc b.

It is obvious that the involute curve e is the involute of the circular arc b because for every turn of the disk 32, the marking point will be a distance equal to the perimeter of the disk away from the point of origin c which of course originally coincided with the point of origin d, which is according to my law and definition of the involute curve.

It is further obvious that any circle may be selected as an evolute within the capacity of the generator and when the gage-arm 19 is set for that circle, its involute curve will be automatically generated by the operation of the means embodied in said generator.

It is also obvious that the translucent center plate 10 may be used in the construction of any drawing instrument or machine involving the use of a rotary member which must be set to move about a fixed center.

Having described my invention, I claim—

1. In a device for generating involute curves, the combination of a member constructed to move about a fixed center, a scriber carried by said member, mechanism for moving said scriber relative to said member as said member moves about the fixed center, to generate an involute, and means for holding said mechanism in a fixed position relatively to said member to generate an involute corresponding to a given evolute.

2. In a device for generating involute curves, the combination of a member having means enabling it to be moved about a fixed center, a scriber mounted on said member, and mechanism for moving said scriber rearwardly relatively to the direction of rotation of said member as said member moves about the fixed center, to generate an involute of a circle.

3. In a device for generating involute curves, the combination of a member constructed to move about a fixed center, a scriber mounted on said member, mechanism for moving said scriber relatively to said member as said member moves about the fixed center, to generate an involute, and means for fixing said mechanism at different points on said member to correspond with different evolutes.

4. In a device for generating involute curves, the combination of a member constructed to move about a fixed center, a scriber carried by said member, mechanism for moving said scriber relatively to said member as said member moves about the fixed center, said mechanism including a driving wheel to engage a surface substantially in the plane of the surface to be scribed, and means for fixing said mechanism on said member to hold said wheel at different distances from the fixed center.

5. In a device for generating involute curves, the combination of an arm having a fixed center about which it may swing, a bracket movably mounted on said arm, a scriber and mechanism carried by said bracket for moving said scriber relatively to said arm as the arm moves about the fixed center, and means for fixing said bracket on said arm at different points to correspond with different evolutes.

6. In a device for generating involute curves, the combination of an arm having a fixed center about which it may swing, a bracket movably mounted on said arm, a scriber and mechanism carried by said bracket including a driving wheel to run on the surface being scribed, for moving said scriber relatively to said arm as the arm moves about the fixed center, and means for fixing said bracket on said arm to hold said wheel at different points to correspond with different evolutes.

7. In a drafting device, an arm having an opening therein, a translucent disk mounted in said opening and having means for fixing the same to the surface to be drawn upon, said disk having a center point indicated thereupon to enable said disk to be superposed concentrically on a given circle, said arm having pivotal movement about said disk, and a scriber carried by said arm.

8. In a device for generating an involute curve upon a surface and corresponding to a given evolute drawn on said surface, the combination of an arm having a fixed center, a wheel carried by said arm to roll along the evolute on said surface, a scriber mounted to move substantially in the plane of said wheel, and means for moving said scriber away from said wheel an amount substantially equal to the peripheral movement of said wheel along an arc of the evolute.

9. In a device for generating an involute curve upon a surface, and corresponding to a given evolute drawn on said surface, the combination of an arm having a fixed center, a wheel carried by said arm to roll along the evolute on said surface, a scriber mounted to move substantially in the plane of said wheel, and movable into a position in which the point of said scriber substantially coincides with the point of tangency of said wheel with the said surface, and means for moving said scriber away from said wheel an amount substantially equal to the peripheral movement of said wheel as it rolls along an arc of the evolute.

10. In a device for scribing a line upon a surface, the combination of a translucent plate having a center point indicated thereupon and having means for fixing the plate to the surface, an arm having an opening receiving said plate and enabling said arm to rotate about said plate, and a scriber connected with said arm and actuated by the movement of said arm.

11. In a device for generating an involute curve, the combination of a translucent plate having a center point indicated thereupon and having means for fixing the same to the surface to be scribed upon, a gage-arm having an opening receiving said plate, enabling said arm to rotate about said plate, a guide arm movably mounted on said first named arm and having means for fixing the same thereto, a scriber mounted to move on said guide arm, and mechanism for moving said scriber outwardly on said guide arm, including a driving wheel the edge whereof engages the surface to be scribed upon.

12. In a machine of the class described, the combination of a member constructed to rotate about a fixed center, a scriber carried by said member at a point on said member removed from said center, whereby said point describes an arc when said member rotates and means for moving said scriber away from said point as said member rotates about said center a distance equal to the arc described by said point about said center.

Signed this 4th day of April, 1917.

OLIVER G. SIMMONS.